2,783,213
Patented Feb. 26, 1957

2,783,213

RUBBER RECLAIMS AND PROCESS FOR PRODUCING SAME

Rée Vilma le Beau, Clayton, Mo., assignor to Midwest Rubber Reclaiming Company, East St. Louis, Ill., a corporation of Delaware Application August 18, 1952, Serial No. 305,077

9 Claims. (Cl. 260—2.3)

This invention relates to natural and synthetic rubber reclaims and more particularly to rubber reclaims in a powder or particulate form and the process of producing such reclaims.

Briefly, this invention relates to natural and synthetic rubber reclaims in a powder or particulate form comprising rubber scrap, a reclaiming agent, and a filler having a particle size not substantially greater than 250 microns. This invention also includes the process of producing such reclaims in a powder or particulate form by adding to a rubber scrap, a reclaiming agent and a filler as defined above, thoroughly mixing and completely dispersing it and subjecting the mixture to heat or steam treatment until the scrap is softened and the resulting reclaim in particulate form rendered sufficiently plastic to be used.

Among the several objects of this invention may be noted the provision of rubber reclaims in a powder or particulate form, which yet possess sufficient plasticity and cohesiveness to form sheets when passed through a conventional rubber compounding mill; the provision of rubber reclaims of the form described, which remain in particulate form even after agitation during shipping; the provision of rubber reclaims of the form described of a plasticity suitable for compression and injection molding; the provision of rubber reclaims of the form described of a wider range of plasticity than it has previously been possible to obtain; the provision of rubber reclaims of the form described which can be used directly in the manufacture of rubber goods without the necessity of mechanical working or mastication; and the provision of a process for producing the rubber reclaims of the form described which is more economical and convenient than that obtained by use of the conventional reclaiming methods. Other objects and features will be in part apparent and in part pointed out hereinafter.

The invention accordingly comprises the products and methods hereinafter described, the scope of the invention being indicated in the following claims.

The purpose of the natural and synthetic rubber reclaiming processes is to render vulcanized elastomer scrap plastic, cohesive, tacky and ready for re-use. Reclaimed rubber as produced heretofore has been in the shape of slabs. These slabs were obtained commercially by passing the plasticized elastomer scrap between rollers exerting pressure and friction and producing thereby a very thin sheet (about 0.003 to 0.010" thick) which is built up by continuous winding on a take off roll, and thereafter removed from the roll as cohesive slabs. This "refining" operation had the purpose of smoothing out the plasticized scrap and making the resulting reclaim more uniform.

It was, of course, possible to pelletize the reclaim from the finished reclaim slab by the use of additional machinery conventionally employed in the rubber industry. However, because of this, the procedure has not been widely adopted and reclaimed rubber has generally been shipped from the reclaimer to the manufacturer of vulcanized articles in the form of large slabs.

The "refining" operation described above also limited the range of plasticity of the finished reclaim. Reclaims of lesser plasticity would cause an inordinate generation of heat when passed between the tight rollers, the dissipation of which often could not be controlled by ordinary means such as water cooling of the rollers. On the other hand reclaims of very high plasticity could not be produced because the stress which is applied to the very thin reclaim sheet right after its formation and at the point of take-off and windup would be too large to be carried by a very soft and plastic sheet. This caused breaks in the sheet, resulting in a loss in production.

The present invention produces reclaimed rubber in powder or particulate form of a very uniform degree of reclaiming without subjecting it to the "refining" operation, of a range of plasticity which is considerably wider than any heretofore possible, and of desirable physical properties. This development is not only advantageous from the point of view of the economics of reclaim production, but also it is important because of the enormous development of the various synthetic elastomers within recent years which makes it desirable to possess the means by which the properties of reclaim can be varied and adapted more easily to elastomers and processes which make use of it.

To carry out my invention, defibered whole tire scrap or other scrap is ground finely, mixed with reclaiming agents commonly used in the reclaiming of rubber, and a filler of small particle size, not substantially greater than 250 microns (preferably having a low bulk density), is added. It is essential that the filler be thoroughly mixed and completely dispersed in the scrap and reclaiming agents. If this mixing is not carried out properly, the final reclaim will not be in powder or particulate form and the mass of reclaim particles will cohere after reclaiming. The filler is adsorbed on the scrap particles to which the reclaiming agents have been added. The amount of filler necessary depends upon the kind and particle size of the scrap, the properties of the filler used, and the degree of plasticity desired. The temperature at which the reclaiming operation is carried out is of importance only insofar as it will affect the plasticity of the finished reclaim and the time required to obtain such plasticity, but should be above the boiling point of water and preferably between approximately 300° and 482° F. Time intervals up to 24 hours, for example, have been employed.

Reclaiming can be carried out stationary, in batch form, by heating in steam, or continuously by heating in steam or other largely inert atmosphere or by heating in air. However, it cannot be carried out according to any process where mastication of the scrap is necessary.

As the reclaiming process is carried out according to the present invention, each elastomer scrap particle is isolated from its contact with its neighbor. Rubber is known to be one of the materials possessing extraordinarily poor heat transfer. Inasmuch as almost all fillers show better heat transfer characteristics than rubber, the heat transfer throughout the mass, even when a stationary reclaiming process is applied, whereby a thick layer of vulcanized scrap rubber particles has to be penetrated by heat from the outside, is very much improved, resulting in a much more uniform product than ordinarily obtained. While it is not necessary to grind the rubber scrap very finely, fine grinding is preferred because of the development of a larger surface area.

Any filler or filler mixture having a particles size not substantially greater than 250 microns and which is substantially inert to (e. g., not solubilized by) reclaiming process conditions can be used, but as previously noted fillers of very fine particle size and low bulk density are preferred. Conveniently, such fillers as are generally used in rubber compounding practice are used in this process. When reclaiming is carried out in live steam, fillers which imbibe water and swell, such as bentonitic clays or methyl cellulose, can also be used. Ordinarily, however, dry fillers are preferred.

Many fillers have been found suitable provided they are of appropriate particle size. Among these may be mentioned various kinds of carbon black, either in pelletized or nonpelletized form, including semireinforcing furnace (SRF), high abrasion furnace (HAF), high modulus furnace (HMF), thermatomic and channel blacks. All carbon blacks used in the compounding of rubber goods as well as surface activated blacks of vegetable and mineral origin are suitable. Silica and hydrated silica, alumina and hydrated alumina, calcium oxide, magnesium oxide, zinc oxide, calcium carbonate, megnesium carbonate, barium sulfate, aluminum sulfate, calcium silicates, magnesium silicates, aluminum silicates, magnesium aluminum silicates, hydrous magnesium silicates and aluminum silicates, and diatomaceous silica are suitable either in their precipitated or in their natural form. Lithopone, wood flour and powdered lignite can also be used. The character of the finished reclaim powder produced will depend in part upon the effect which the particular filler exerts when compounded with natural and synthetic rubbers and their reclaims.

Reclaiming oils and catalysts, i. e., reclaiming agents, do not exert any specific or altered effect on this process. Reclaiming oils and catalysts, in general, can be used singly or in mixtures in varying amounts depending upon the type of scrap employed and the plasticity of the reclaim desired. Among these may be mentioned alkyl phenol sulfides, amino compounds including polyamines, hydrazine compounds, aliphatic and aromatic mercaptans, substituted olefins, diolefines, terpenes, dipentene, pine tar oils, thiols, thiophene derivatives, unsaturated and aromatic compounds from coal tar naphthas and petorleum naphthas, coal tars, organic disulfides, Gray Tower resins and oils, abietic acid and isomers, and xylenes and derivatives.

Chemical defibering agents, such as solutions of alkali or metallic chlorides including calcium, zinc and aluminum chlorides, may be added to change the character of the resulting reclaim. See D. S. Le Beau, Basic reactions occurring during rubber reclaiming—I, India Rubber World April 1948. The addition of metallic chloride aids in producing a reclaim in particulate form but is not necessary. However, it is often required to give certain processing properties to the final reclaim.

The following examples illustrate the invention:

Example 1

100 parts of 30 mesh ground defibered tire scrap
20 parts of a mixture of solvent naphtha and pine tar oil
5 parts of activated carbon of less than 74 microns particle size
10 parts of water were thoroughly interdispersed, placed in an autoclave and subjected to live steam for five hours at 185 p. s. i. The material produced was in the form of individual plastic particles.

Example 2

100 parts of 16 mesh ground defibered tire scrap
20 parts of a mixture of solvent naphtha and pine tar oil
3 parts of activated carbon of less than 74 microns particle size were thoroughly interdispersed, placed in an autoclave and subjected to live steam for five hours at 200 p. s. i. The material produced was in the form of individual plastic particles.

Example 3

100 parts of ground defibered 30 mesh tire scrap
16 parts of Gray Tower polymer oils
3 parts of highly calcined magnesia having a particle size of less than 44 microns were thoroughly interdispersed, and placed in live steam for six hours at 185 p. s. i. The material produced was in the form of individual plastic particles.

Example 4

100 parts of ground defibered 8 mesh whole tire scrap
10 parts of solvent naphtha containing 0.5 part of xylyl disulfides (sold under the designation "RR–10")
8 parts of clay having a particle size of less than 50 microns
10 parts of water were thoroughly interdispersed and subjected to live steam for nine hours at 185 p. s. i. The resulting reclaim remained in particulate form. However, it was cohesive and plastic enough to be handled easily on ordinary rubber compounding equipment.

Example 5

100 parts of ground defibered 16 mesh whole tire scrap
30 parts of Gray Tower resin oil
5 parts of abietic acid
45 parts of high modulus furnace black having an average particle diameter of approximately 50 millimicrons were thoroughly interdispersed and subjected to live steam for nine hours at 195 p. s. i. The reclaim remained in particulate form. However, it was so plastic that it formed a coherent sheet immediately if it later was passed through a rubber compounding mill. Ordinarily, it would have taken a considerable amount of time to mix such an extraordinarily high amount of carbon black into reclaim or crude rubbers on the mill. However, if the above reclaim in particulate form is added to crude synthetic or natural rubber it will disperse readily and much quicker than if the conventional compounding methods had been used. The physical properties of tire carcass compounds prepared from the reclaim powders of the present invention are at least equivalent or superior to those of conventional first line tire reclaims. This can be attributed to excellent dispersion and less abuse of the reclaimed polymer as compared with the conventional reclaims, which have undergone extensive working and breakdown during the refining process.

When a carbon black suitable for tire tread compounding is used as a filler, instead of high modulus furnace (HMF) carbon black, the physical properties of the resulting reclaim in powder or particulate form are equivalent or superior to those of conventional first line tire reclaims used for that purpose.

Example 6

100 parts of 16 mesh ground defibered tire scrap
13 parts of a mixture of pine tar oil and solvent naphtha
4 parts of a mixture of primary fatty acid amines
20 parts semireinforcing carbon black having an average particle size of 70 millimicrons were thoroughly interdispersed and subjected to live steam for five hours at 200 p. s. i. The material produced was in the form of individual plastic particles which were sufficiently plastic to become coherent immediately upon compounding on conventional rubber processing equipment.

Example 7

100 parts of 16 mesh ground defibered tire scrap
10 parts of coal tar
10 parts of solvent naphtha
1 part of xylyl mercaptan
7.5 parts of hydrated precipitated calcium silicate having a particle size of 3 microns or less were thoroughly interdispersed and subjected to live steam at 195 p. s. i. for eight hours. The material produced was in the form of individual plastic particles.

Example 8

100 parts of 12 mesh ground defibered tire scrap
18 parts of a mixture of coal tar and Gray Tower resin oil
7 parts of hydrated silica having a particle size of 1 micron or less were subjected to live steam at 195 p. s. i. for five hours after they had been thoroughly interdispersed. The material produced was in the form of individual plastic particles.

Example 9

100 parts of 14 mesh ground defibered tire scrap
18 parts of a mixture of coal tar and Gray Tower resin oil
7 parts of diatomaceous earth having a particle size of 6 microns or less were thoroughly interdispersed and subjected to live steam at 200 p. s. i. for four hours. The material produced was in the form of individual plastic particles.

Example 10

100 parts of 16 mesh fiber free high styrene GR-S scrap
15 parts of pine tar oil
5 parts of calcium carbonate precipitated having a particle size of less than 44 microns were thoroughly interdispersed and heated in live steam for seven hours at a temperature of 392° F. The resultant product was a plastic reclaim in particulate form.

Example 11

100 parts of 16 mesh vulcanized defibered whole tire scrap
25 parts of a mixture of Gray Tower resin oil and abietic acid
40 parts of high modulus furnace carbon black were thoroughly interdispersed and heated at 482° F. for eight minutes in a closed vessel. The material produced was in the form of individual plastic particles.

Example 12

100 parts of 8 mesh vulcanized natural rubber passenger tube scrap
5 parts of solvent naphtha
20 parts of carbon black were thoroughly interdispersed and heated for five hours at 185 p. s. i. live steam. The resulting product was a plastic reclaim in particulate form.

Example 13

100 parts of vulcanized Butyl tubes ground to 8 mesh
5 parts of paraffinic hydrocarbon oil
2.5 parts of highly calcined magnesium oxide were thoroughly interdispersed and heated for nine hours at 185 p. s. i. live steam. The mixture remained in particulate form after reclaiming. On the other hand, it was soft and plastic when used subsequently for compounding.

Example 14

100 parts of vulcanized neoprene and Hycar scrap mixture ground to 8 mesh
10 parts of a solution of primary aliphatic amines in solvent naphtha
2.5 parts of highly calcined magnesium oxide were thoroughly interdispersed and heated for five hours at 195 p. s. i. live steam. The material produced was in the form of individual plastic particles.

Example 15

100 parts of 12 mesh defibered whole tire scrap
17 parts of a mixture of Gray Tower polymer resin oils and abietic acid
5 parts of highly calcined magnesia
5 parts of clay were thoroughly interdispersed and subjected to live steam at 392° F. for six hours. The resulting particulate reclaim was plastic and ready for immediate re-use.

Example 16

100 parts of 8 mesh defibered ground tire scrap
18 parts of a mixture of coal tar and pine tar oil
25 parts of aluminum hydroxide having an average particle size of 150 microns were thoroughly interdispersed, subjected to live steam at 150 p. s. i. for sixteen hours. The resulting plastic product was in particulate form.

Example 17

100 parts of ground defibered tire scrap ground to pass through a 60 mesh screen
20 parts of Gray Tower resin oil
3 parts of pine tar oil
50 parts of channel black were thoroughly interdispersed and subjected to live steam at 195 p. s. i. for five hours. The resulting reclaim was plastic, yet remained in particulate form.

Example 18

The stability to agitation of the rubber reclaims of the present invention was tested as follows. Two one-gallon containers were filled with rubber reclaim in particulate form containing carbon black made in accordance with the present invention. The rubber powder in one container was of approximately the same degree of plasticity as a conventional whole tire reclaim and had been made by the Example 5 procedure. The rubber reclaim powder in the other container was also produced by the Example 5 procedure but had been made to such a high degree of softness that it would not be possible to produce it by a conventional reclaiming process. The two containers were transported over highways for 1000 miles, and then samples of reclaim powder were withdrawn from the top and bottom portions of each container, and analyzed quantitatively for the amount of carbon black present. In each case, the amount of carbon black present in the top and bottom portions of each container was found to be identical, whereas purely mechanical mixtures of reclaim particles and carbon black particles would separate and settle because of differences in specific gravity and particle size between the two components. The carbon black particles are so well dispersed and firmly attached to the reclaim particles that it is possible to handle the material without any trouble whatsoever. This attachment, however, occurs during the reclaiming process and is not evident to any extent after the mixing stage and prior to being subjected to reclaiming.

It is to be understood that the particulate rubber reclaim materials of the preceding example are of such plasticity that they can be used directly with conventional rubber compounding equipment, either per se or in conjunction with other elastomers, for the production of new articles.

The reclaims of the present invention are well-suited for compounding with the oil extended GR-S rubbers. It is also possible to make water slurries of these reclaims in particulate form by the means known to the art today, and to add these slurries to natural or synthetic elastomer lattices.

A tire carcass compound consisting of GR-S, natural rubber and a reclaim powder of the present invention will show 70–100% greater tear resistance than that obtained from an identical compound containing conventional reclaim. This can be attributed to the better dispersion obtained by the use of the reclaim powders of this invention.

The reclaims of the present invention can be mixed in particulate form with the necessary vulcanizing ingredients and molded by compression, resulting in smooth, uniform molded pieces having good surface gloss. Depending upon the plasticity of the reclaim, it can also be used for injection molding. The kind of filler and the plasticity of the reclaim powder will determine its use.

Throughout the foregoing examples all parts are parts by weight.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

I claim:

1. The process of producing reclaimed rubber in particulate form from previously vulcanized rubber scrap, comprising thoroughly interdispersing discrete particles of ground vulcanized rubber scrap with a reclaiming agent and a filler to obtain a mixture in the form of finely divided particles, said filler being substantially inert to reclaiming process conditions and having a particle size not substantially greater than about 250 microns, and thereafter heating the resulting dispersion of substantially dry finely divided particles without mastication until the scrap is softened and the resulting reclaim in finely divided particulate form is rendered sufficiently plastic without further milling and refining to be used for the production of new articles.

2. The process of producing reclaimed rubber in particulate form from previously vulcanized rubber scrap, comprising thoroughly interdispersing discrete particles of ground vulcanized rubber scrap with a reclaiming agent and a low bulk density filler to obtain a mixture in the form of finely divided particles, said filler being substantially inert to reclaiming process conditions and having a particle size not substantially greater than about 250 microns, and thereafter heating the resulting dispersion of substantially dry finely divided particles without mastication until the scrap is softened and the resulting reclaim in finely divided particulate form is rendered sufficiently plastic without further milling and refining to be used for the production of new articles.

3. The process of producing reclaimed rubber in particulate form from previously vulcanized rubber scrap, comprising thoroughly interdispersing discrete particles of ground vulcanized rubber scrap with a reclaiming agent and a filler to obtain a mixture in the form of finely divided particles, said filler being substantially inert to reclaiming process conditions and having a particle size not substantially greater than about 250 microns, and thereafter treating the resulting dispersion of substantially dry finely divided particles without mastication with steam until the scrap is softened and the resulting reclaim in finely divided particulate form is rendered sufficiently plastic without further milling and refining to be used for the production of new articles.

4. The process of producing reclaimed rubber in particulate form from previously vulcanized rubber scrap, comprising thoroughly interdispersing discrete particles of ground vulcanized rubber scrap with a reclaiming agent, a filler to obtain a mixture in the form of finely divided particles, and a defibering agent, said filler being substantially inert to reclaiming process conditions and having a particle size not substantially greater than 250 microns and thereafter heating the resulting dispersion of substantially dry finely divided particles without mastication until the scrap is softened and the resulting reclaim in finely divided particulate form is rendered sufficiently plastic without further milling and refining to be used for the production of new articles.

5. The process of producing reclaimed rubber in particulate form from previously vulcanized rubber scrap, comprising thoroughly interdispersing discrete particles of ground vulcanized rubber scrap with a reclaiming agent and a filler to obtain a mixture in the form of finely divided particles, said filler being substantially inert to reclaiming process conditions and having a particle size not substantially greater than about 250 microns and thereafter heating the resulting dispersion of substantially dry finely divided particles without mastication until the scrap is softened and the resulting reclaim in finely divided particulate form is rendered sufficiently plastic without further milling and refining to be molded by compression and injection.

6. The process of producing reclaimed rubber in particulate form from previously vulcanized rubber scrap, comprising thoroughly interdispersing discrete particles of ground vulcanized rubber scrap with a reclaiming agent and a filler to obtain a mixture in the form of finely divided particles, said filler being substantially inert to reclaiming process conditions and having a particle size not substantially greater than about 250 microns, and thereafter heating the resulting dispersion of substantially dry finely divided particles without mastication under pressure until the scrap is softened and the resulting reclaim in finely divided particulate form is rendered sufficiently plastic without further milling and refining to be used for the production of new articles.

7. The process of producing reclaimed rubber in particulate form from previously vulcanized rubber scrap, comprising thoroughly interdispersing discrete particles of ground vulcanized rubber scrap with a reclaiming agent and a filler to obtain a mixture in the form of finely divided particles, said filler being substantially inert to reclaiming process conditions and having a particle size not substantially greater than about 250 microns, and thereafter treating the resulting dispersion of substantially dry finely divided particles without mastication with steam at temperatures not substantially less than approximately 300° F. until the scrap is softened and the resulting reclaim in finely divided particulate form is rendered substantially plastic without further milling and refining to be used for the production of new articles.

8. The process of producing reclaimed rubber in particulate form from previously vulcanized rubber scrap, comprising thoroughly interdispersing discrete particles of ground vulcanized rubber scrap with a reclaiming agent and carbon black to obtain a mixture in the form of finely divided particles, said carbon black having a particle size not substantially greater than about 250 microns, and thereafter heating the resulting dispersion of substantially dry finely divided particles without mastication with steam under pressure until the scrap is softened and the resulting reclaim in finely divided particulate form is rendered sufficiently plastic without further milling and refining to be used for the production of new articles.

9. The process of producing reclaimed rubber in particulate form from previously vulcanized rubber scrap, comprising thoroughly interdispersing discrete particles of ground vulcanized rubber scrap with a reclaiming agent and a metal silicate to obtain a mixture in the form of finely divided particles, said metal silicate having a particle size not substantially greater than about 250 microns, and thereafter heating the resulting dispersion of substantially dry finely divided particles without mastication with steam under pressure until the scrap is softened and the resulting reclaim in finely divided particulate form is rendered sufficiently plastic without further milling and refining to be used for the production of new articles.

(References on following page)

References Cited in the file of this patent

UNITED STATES PATENTS

| | | |
|---|---|---|
| 1,957,298 | Shepard et al. | May 1, 1934 |
| 2,278,826 | Castello et al. | Apr. 7, 1942 |
| 2,433,179 | Wheeler | Dec. 23, 1947 |
| 2,461,193 | Banbury | Feb. 8, 1949 |
| 2,469,529 | Tewksbury et al. | May 10, 1949 |
| 2,593,279 | Elgin | Apr. 15, 1952 |
| 2,673,844 | Gilcrease | Mar. 30, 1954 |

FOREIGN PATENTS

| | | |
|---|---|---|
| 557,803 | Great Britain | Dec. 6, 1943 |
| 577,868 | Great Britain | June 4, 1946 |